United States Patent
Sakai et al.

(10) Patent No.: US 8,155,824 B2
(45) Date of Patent: Apr. 10, 2012

(54) ELECTRONIC CONTROL APPARATUS FOR VEHICLES, WHICH IS PROVIDED WITH PLURAL MICROCOMPUTERS

(75) Inventors: Naoto Sakai, Takahama (JP); Toru Itabashi, Anjo (JP); Michio Nakamura, Toyoake (JP)

(73) Assignee: Denso Corporation, Kariya (JP)

( * ) Notice: Subject to any disclaimer, the term of this patent is extended or adjusted under 35 U.S.C. 154(b) by 701 days.

(21) Appl. No.: 12/364,671

(22) Filed: Feb. 3, 2009

(65) Prior Publication Data

US 2009/0198407 A1 Aug. 6, 2009

(30) Foreign Application Priority Data

Feb. 4, 2008 (JP) ................................ 2008-024095

(51) Int. Cl.
*G01M 17/00* (2006.01)
*B60R 16/023* (2006.01)

(52) U.S. Cl. ..................... 701/34.3; 701/31.7; 701/29.2; 701/33.6

(58) Field of Classification Search ...................... 701/31
See application file for complete search history.

(56) References Cited

U.S. PATENT DOCUMENTS

| | | | | | |
|---|---|---|---|---|---|
| 5,372,410 | A | * | 12/1994 | Miller et al. ............. | 303/122.05 |
| 5,987,365 | A | * | 11/1999 | Okamoto .................. | 701/29 |
| 6,230,094 | B1 | | 5/2001 | Ohashi et al. | |
| 6,356,821 | B1 | * | 3/2002 | Yoshida .................. | 701/31 |
| 6,437,531 | B1 | * | 8/2002 | Kawamura .............. | 318/445 |
| 6,496,772 | B1 | * | 12/2002 | Bolz ....................... | 701/114 |
| 6,654,648 | B2 | * | 11/2003 | Nada et al. ............... | 700/19 |
| 6,804,564 | B2 | * | 10/2004 | Crispin et al. ........... | 700/79 |
| 6,807,477 | B2 | * | 10/2004 | Hirata ...................... | 701/114 |
| 7,013,241 | B2 | | 3/2006 | Yamada | |
| 7,019,486 | B1 | * | 3/2006 | Kifuku et al. ........... | 318/806 |
| 7,047,443 | B2 | * | 5/2006 | Kudo et al. ............. | 714/30 |
| 7,100,086 | B1 | * | 8/2006 | Kudo et al. ............. | 714/30 |
| 7,516,025 | B1 | * | 4/2009 | Williams et al. ........ | 702/57 |
| 7,759,890 | B2 | * | 7/2010 | Maeda .................... | 318/432 |
| 2001/0027537 | A1 | * | 10/2001 | Nada et al. .............. | 714/23 |
| 2003/0105537 | A1 | * | 6/2003 | Crispin et al. ........... | 700/20 |
| 2004/0153802 | A1 | * | 8/2004 | Kudo et al. ............. | 714/30 |
| 2005/0097401 | A1 | * | 5/2005 | Kudo et al. ............. | 714/39 |
| 2005/0223296 | A1 | * | 10/2005 | Usui ........................ | 714/39 |
| 2006/0055365 | A1 | * | 3/2006 | Kifuku et al. ........... | 318/806 |
| 2006/0247835 | A1 | * | 11/2006 | Nagata ..................... | 701/36 |
| 2007/0023509 | A1 | * | 2/2007 | Kusunoki et al. ....... | 235/384 |

FOREIGN PATENT DOCUMENTS

JP 61-039138 2/1986
JP 64-028749 1/1989
(Continued)

OTHER PUBLICATIONS

Japanese Office Action dated Dec. 8, 2009, issued in corresponding Japanese Application No. 2008-024095, with English translation.

*Primary Examiner* — Shelley Chen
(74) *Attorney, Agent, or Firm* — Nixon & Vanderhye P.C.

(57) ABSTRACT

An electric control apparatus for a vehicle is provided. The apparatus comprises at least two microcomputers, an external monitoring unit, and an internal monitoring means. The two microcomputers are composed of a first microcomputer and a second microcomputer, The first microcomputer is assigned to controlling travel functions of a vehicle. The external monitoring unit monitors whether or not the first microcomputer is in a normal operation and is placed outside the first and second microcomputers. The internal monitoring means monitors whether or not the first microcomputer is in a normal operation and is within the first microcomputer.

16 Claims, 4 Drawing Sheets

FOREIGN PATENT DOCUMENTS

| JP | 10-154085 | 6/1998 |
| JP | 2003-137045 | 5/2003 |
| JP | 2007-041824 | 2/2007 |
| JP | 2007-213137 | 8/2007 |

* cited by examiner

ELECTRONIC CONTROL APPARATUS FOR VEHICLES, WHICH IS PROVIDED WITH PLURAL MICROCOMPUTERS

CROSS-REFERENCE TO RELATED APPLICATION

This application is based on and claims the benefit of priority from earlier Japanese Patent Application No. 2008-024095 filed Feb. 4, 2008, the description of which is incorporated herein by reference.

BACKGROUND OF THE INVENTION

1. Technical Field of the Invention

The present invention relates to an electronic control apparatus, which is used by being loaded on vehicles and provided with plural microcomputers.

2. Related Art

As the functions of automobiles (vehicles) become complicated, the number of electronic control apparatuses loaded on a vehicle is more and more increasing. Typical conventional electronic control apparatus have been configured so that each of the plurality of functions of a vehicle is provided with one electronic control unit. To take measure for the increasing number of electronic control units, it has been suggested that the electronic control units be integrated into a single system.

In such an electronic control apparatus with integrated electronic control apparatuses, it is considered that a microcomputer is required for each of the plurality of functions. This is because use of only a single microcomputer will not be sufficient for fully performing the processes for realizing the plurality of functions.

In such an electronic control apparatus with integrated so electronic control apparatuses having a plurality of microcomputers, it is considered that the system may have a configuration in which one microcomputer controls travel functions (particularly, running, steering and stopping functions) which are fundamental functions of a vehicle, and that other microcomputers control functions other than the travel functions (e.g., functions associated with power supply to other devices and security).

Typical conventional electronic control apparatus with a microcomputer have been configured so that the apparatus will be provided with a monitoring circuit which monitors whether or not the microcomputer is in normal operation and, when malfunction is found, performs failsafe processes, such as initialization.

Meanwhile, an electronic control apparatus with integrated electronic control apparatuses having a plurality of microcomputers is disclosed, for example, in Japanese Patent Publication (Laid-open) No. 2007-041824. The electronic control apparatus disclosed in this reference is ensured to have a monitoring circuit for each of the plurality of microcomputers.

Let us assume a case where the technique disclosed in the above reference is applied to the above-mentioned electronic control apparatus in which one of the plurality of microcomputers controls travel functions of a vehicle and other microcomputers control the functions other than the travel functions. In such a case, the system will have a configuration where each of the microcomputers is provided with a monitoring circuit.

With this configuration, however, if malfunction occurs in the monitoring circuit for the microcomputer that controls the travel functions, monitoring will no longer be enabled as to whether or not the control is in good order for the particularly important travel functions of the vehicle.

SUMMARY OF THE INVENTION

The present invention has been made to provide an electronic control apparatus, which is able to enhance the reliability of controlling behavior of the vehicle with reduced number of circuits.

In order to achieve the above object, there is provided, as a basic structure, an electric control apparatus for a vehicle, comprising: at least two microcomputers composed of at least a first microcomputer and a second microcomputer, the first microcomputer being assigned to controlling travel functions of a vehicle; an external monitoring unit that monitors whether or not the first microcomputer is in a normal operation, wherein the external monitoring unit is placed outside the first and second microcomputers; and an internal monitoring means that monitors whether or not the first microcomputer is operating normally, wherein the internal monitoring means is within the first microcomputer.

The controls associated with the travel functions of the vehicle include, for example, control for motive power sources for traveling, such as the engine and the electric motor, control for a motive power transmission mechanisms (e.g. the speed change gear and the torque distributor) from the motive power sources to the wheels, control for steering of the wheels and control for braking. The first microcomputer performs at least one of the controls.

In particular, the first microcomputer is adapted to be monitored not only by the monitoring means provided for the first microcomputer but also by the second microcomputer.

Thus, the occurrence of malfunction in the monitoring means for the first microcomputer can be monitored by the second microcomputer. Contrarily, the occurrence of malfunction in the second microcomputer can be monitored by the monitoring means.

According to the electronic control apparatus set forth as the foregoing basic structure, the double monitoring system can be established for the first microcomputer which effects the important controls associated with the travel functions, and there is no necessity so of providing the two monitoring means consisting of circuits separately from the first microcomputer. Thus, the reliability of the vehicle can be enhanced, while the increase of the number of circuits can be suppressed.

It is preferred that the apparatus comprises a power supply unit that supplies power-supply voltage to the first microcomputer in response to a power control signal, the power-supply voltage starting up the first microcomputer, wherein the second microcomputer comprises determining means that determines whether or not the first microcomputer needs to start up, and switching means that switches over between an output action and a non-output action of the power control signal to be given to the power supply unit based on results determined by the determining means as to starting up the first microcomputer.

In this configuration, the second microcomputer that monitors the first microcomputer is adapted to control power supply to the first microcomputer. Thus, the configuration can be easily realized, in which the second microcomputer monitors the operation of the first microcomputer only when power voltage is supplied to the first microcomputer. In other words, the second microcomputer may just be configured to monitor the operation of the first microcomputer only when the power control signal are outputted to the power supplying means.

Thus, in the absence of the supply of power voltage to the first microcomputer, the second microcomputer cannot monitor the operation of the first microcomputer to make an erroneous determination of malfunctions. In this way, such a disadvantage can easily be prevented.

It is also preferred that the first microcomputer comprises providing means that provides the external monitoring unit with an operation signal showing that the first microcomputer is in operation, and the external monitoring unit is formed to monitor operations of the so first microcomputer during reception of the operation signal With this configuration, when the first microcomputer has not been in operation, the monitoring means cannot monitor the operation of the first microcomputer to make an erroneous determination of malfunctions. In this way, such a disadvantage can be prevented. Also, when the operation of the first microcomputer is being stopped, the operation of the monitoring means can also be stopped. As a result, unnecessary current consumption of the monitoring means can be reduced.

For monitoring the first microcomputer a specific configuration may be provided as follows, That is, the first microcomputer comprises output means that outputs a monitoring signal to both the internal monitoring means and the external monitoring unit at intervals which are set within a given period of time, the monitoring signal being for allowing both of the internal monitoring means and the external monitoring unit to monitor the operations of the first microcomputer and each of the second microcomputer and the external monitoring unit is formed to output a reset signal to the first microcomputer when the monitoring signal has not been provided from the first microcomputer for a given period of monitoring time, the reset signal resetting the operations of the first microcomputer.

With this configuration, if the programs have run out of control (malfunctioned) in the first microcomputer and the signals to be monitored are no longer outputted, the reset signal may be imparted to the first microcomputer in an attempt to have the first microcomputer returned to the normal state.

It is also preferred that the internal monitoring means is given a monitoring time which is set to monitor the operations of the first microcomputer and the external monitoring unit is given a further monitoring time monitor to monitor the operations of the first microcomputer, the monitoring time given to the internal monitoring means being different from the further monitoring time given to the external monitoring unit.

This is because, if the programs in the first microcomputer have run out of control and the signals to be monitored are no longer outputted, the second microcomputer or the monitoring means, whichever has a shorter monitoring time, can first output the reset signal, and because, if the first microcomputer cannot nevertheless return to the normal state, the second microcomputer or the monitoring means, whichever has a longer monitoring time, can then output the reset signal.

In other words, the second microcomputer and the monitoring means can output the reset signal, not simultaneously, but with a certain time lag to increase the chance for the first microcomputer to return to the normal state.

For example, the further monitoring time given to the external monitoring unit is longer than the monitoring time given to the internal monitoring means.

This is because, being separated from the microcomputers and is thus being configured by a hardware circuit, the monitoring means can be considered to have a lower probability of causing malfunction than the second microcomputer that operates according to the program and thus is considered to have high reliability. The configuration may be preferred in order to realize the concept of backing up a high-reliable component in case a low-reliable component has malfunction.

It is preferred that each of the internal monitoring means and the external monitoring unit comprises determining means for determining whether or not the first microcomputer is in a disabled state in which no return of the first microcomputer to a normal state thereof is expected even if the reset signal is given the first microcomputer, and stopping means for making the power supply unit stop supplying the power-supply voltage to the first microcomputer.

This configuration can reliably prevent the first microcomputer in malfunction from affecting controls of travel functions of the vehicle. Thus, the reliability of the vehicle can be enhanced more.

Preferably, the first microcomputer comprises means for monitoring whether or not the second microcomputer is in a normal operation.

This configuration enables the first microcomputer to confirm as to whether or not the first microcomputer, per se, is being normally monitored by the second microcomputer. In other words, the normal operation of the second microcomputer means that the first microcomputer is being normally monitored by the second microcomputer. If the second microcomputer is not in normal operation, the first microcomputer can take some failsafe processes, such as resetting the second microcomputer. Therefore, the reliability of the electronic control apparatus can be enhanced.

In order that the first microcomputer can monitor the second microcomputer, the following configuration, for example, may be is provided.

That is, the second microcomputer comprises outputting means that outputs a monitoring signal to the first microcomputer at intervals which are set within a given period of time, the monitoring signal being for allowing the first microcomputer to monitor operations of the second microcomputer and the first microcomputer is formed to output a reset signal to the second microcomputer when the monitoring signal has not been provided from the second microcomputer for a given period of monitoring time, the reset signal resetting the operations of the second microcomputer.

With this configuration, if the programs have run out of control in the second microcomputer to no longer enable outputting of the signals to be monitored to the first microcomputer, the reset signal can be imparted to the second microcomputer in an attempt to have the second microcomputer returned to the normal state.

It is also preferred that the apparatus comprises a power supply unit that supplies power-supply voltage to the first microcomputer, the power-supply voltage starting up the first microcomputer; determining means that determines whether or not both the internal monitoring means of the second microcomputer and the external monitoring unit are malfunctioning; and stopping means that makes the power supply unit stop supplying the power-supply voltage.

Specifically, the electronic control apparatus is adapted to stop power supply to the first microcomputer, under the conditions where the second microcomputer and the monitoring means are both in malfunction and monitoring of the first microcomputer is disabled. Thus, the first microcomputer that might be in malfunction can be prevented from affecting controls of travel functions, whereby the reliability of the vehicle can be further enhanced.

DETAILED DESCRIPTION OF THE PREFERRED EMBODIMENTS

With reference to the accompanying drawings, hereinafter will be described some embodiments of an electronic control apparatus for vehicles, which are according to the present invention.

First Embodiment

Figure 1:
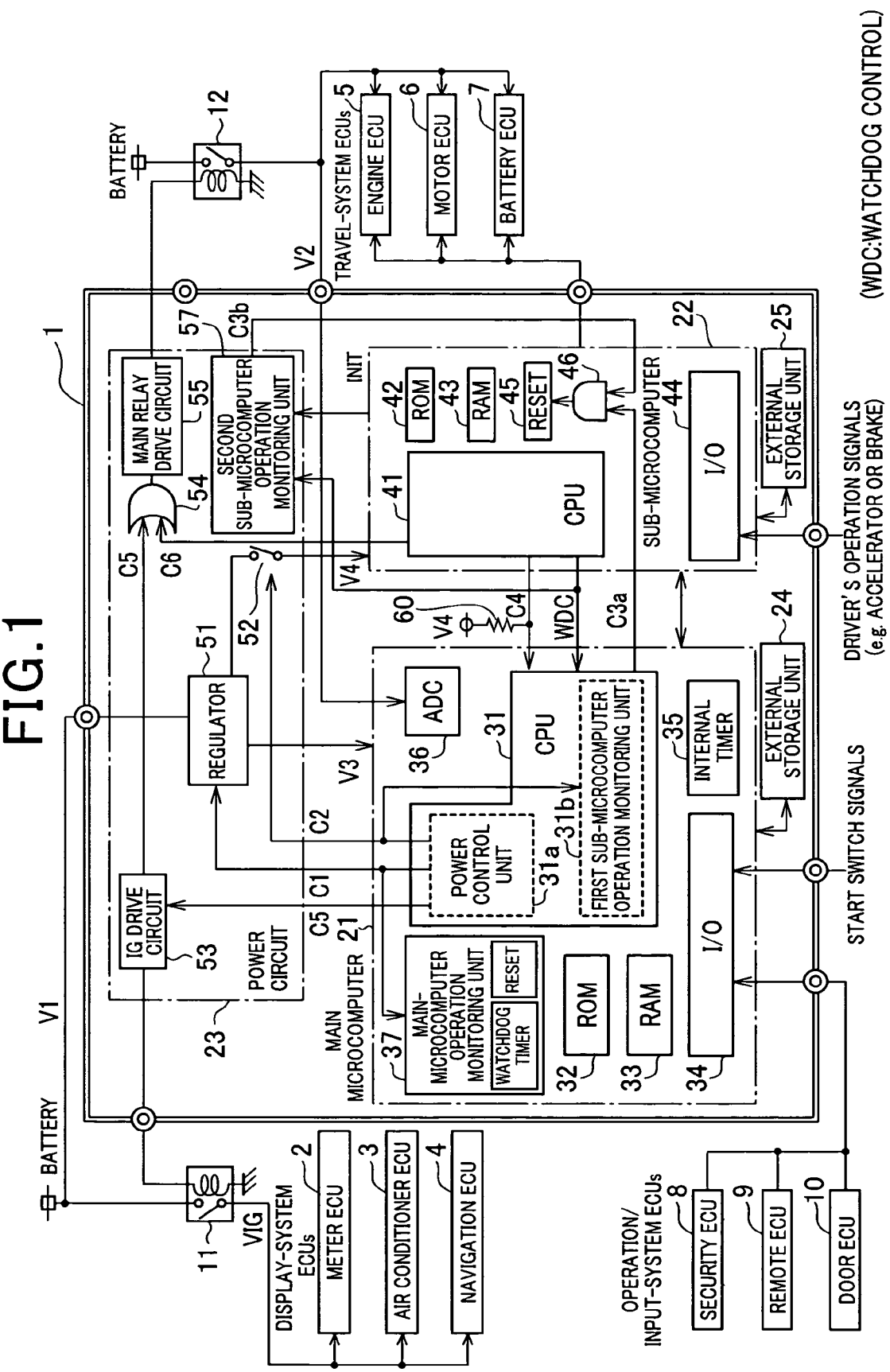
FIG. 1 is a block diagram illustrating an ECU (vehicle electronic control apparatus), according to a first embodiment of the present invention.
Figure 2:
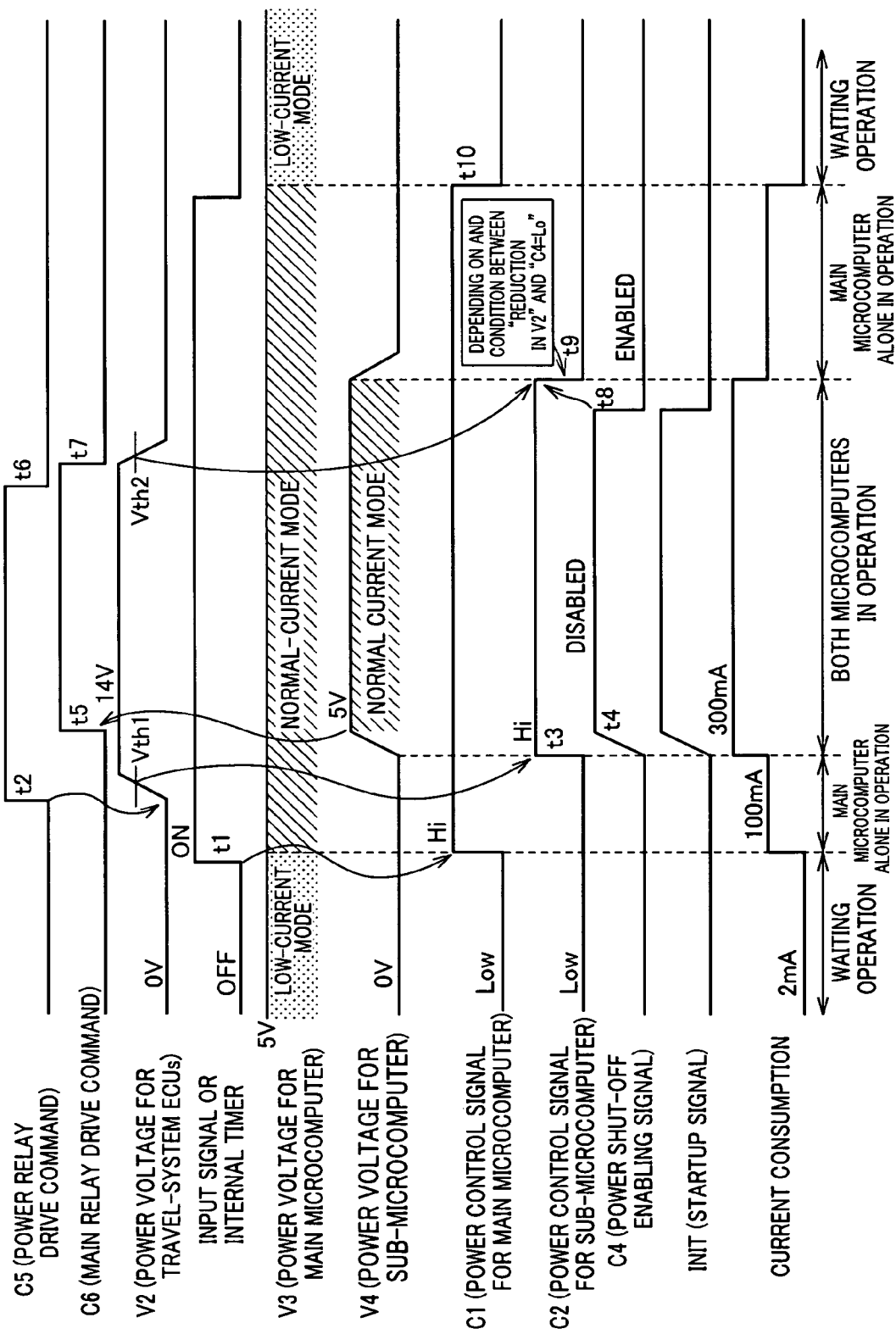
FIG. 2 is a first time diagram illustrating the operation of the ECU of the first embodiment.
Figure 3:
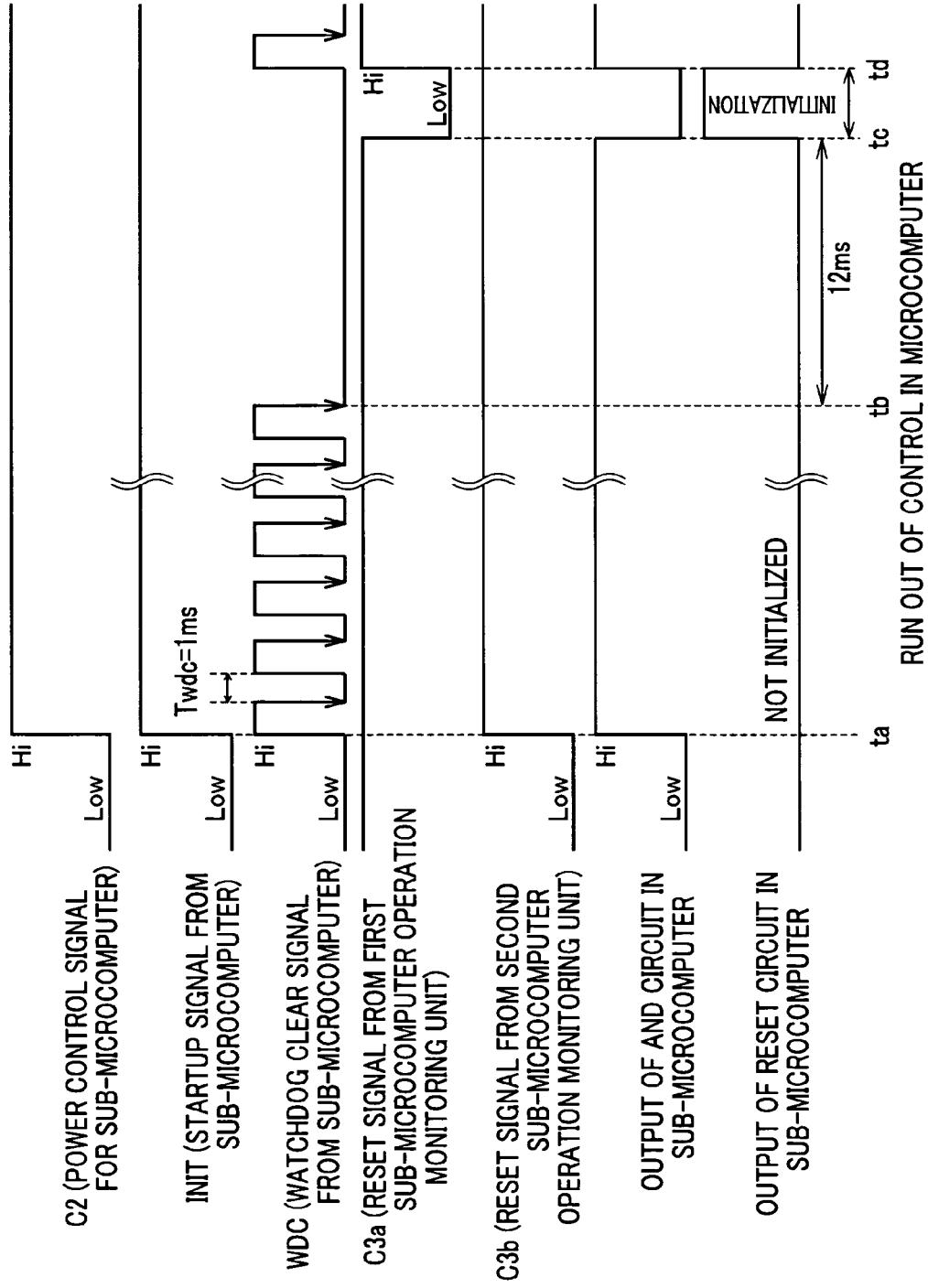
FIG. 3 is a second dime diagram illustrating the operation of the ECU of the first embodiment.

Referring to FIGS. 1-3, a first embodiment of the electronic control apparatus according to the present invention will now be described.

FIG. 1 is a schematic diagram illustrating an electronic control unit 1 mounted in a vehicle, which is put into practice as the electronic control apparatus according to the first embodiment of the present invention.

The electronic control unit 1 of the first embodiment operates being applied with voltage (battery voltage) V1 of an on-vehicle battery. The electronic control unit 1 is provided at least with: a function of supplying power voltage VIG for an ignition system to the ECUs of a display system (in particular, a display function system), such as a meter ECU 2, an air conditioner ECU 3 and a navigation ECU 4; a function of supplying power voltage V2 to the ECUs of a travel-system (travel-relating: in particular, a travel function system), such as an engine ECU 5, a motor ECU 6 and a battery ECU 7; and a function of controlling a motive power source of the vehicle by controlling the travel-system ECUs 5-7 through communication lines.

The meter ECU 2 controls meters of the vehicle. The air conditioner ECU 3 controls the air conditioner of the vehicle. The navigation ECU 4 controls the navigation system of the vehicle. It is so configured that the battery voltage V1 is supplied as the power voltage VIG to the display-system (display-relating) ECUs 2-4 via a relay 11 which is turned on and driven by the electronic control unit 1.

The engine ECU 5 is configured to control the internal combustion engine of the vehicle. The motor ECU 6 is configured to control the electric motor that generates motive power of the vehicle together with the engine. The battery ECU 7 is configured to control the charging of the battery which is not only an energy source of the electric motor but also a power supply of the entire vehicle. It is so configured that the battery voltage V1 is supplied to the travel-system ECUs 5-7 as the power voltage V2, via a relay 12 which is turned on and so driven by the electronic control unit 1. The travel-system ECUs 5-7 control respective objects to be controlled based on the commands and the target values of control obtained from the electronic control unit 1.

The electronic control unit 1 is configured to acquire the information on human operation of the vehicle, by communicating with operation/input-system (operation/input-relating) ECUs, such as a security ECU 8, a remote ECU 9 and a door ECU 10. Further, the electronic control unit 1 is configured to be inputted with a start-switch signal indicative of an on/off state of a push-type start switch which is operated by the driver. Using the push-type start switch, the driver can instruct switching on/off of the power supply of the ignition system and start of the engine. The electronic control unit 1 is also configured to be inputted with signals (driver's operation signals) indicative of the state of operation made by the driver for the accelerator and the brake.

The security ECU 8 is configured to effect control for protecting the vehicle from theft. The remote ECU 9 is configured to communicate with a remote key carried by the driver when the remote key has approached the vehicle. The door ECU 10 is configured to detect opening/closing of the vehicle door and control a door lock actuator and a power window motor, for example. The operation/input-system ECUs 8-10 make such transmissions to the electronic control unit 1 as information indicating opening of the door, information indicating the fact of communication made with the remote key, and check data transmitted from the remote key.

The electronic control unit 1 includes a main microcomputer 21, a sub-microcomputer 22, and a power circuit 23 that supplies constant power voltages V3, V4 for actuating the microcomputers 21, 22. It should be appreciated that the power circuit 23 is an integrated circuit. Also, nonvolatile external storage units 24, 25 each made up of an EEPROM, for example, are connected to the microcomputers 21, 22, respectively.

The main microcomputer 21 is required to operate even in the state where the ignition is turned off. Thus, the main microcomputer 21 is configured to chiefly control application of power to the display-system ECUs 2-4 and the travel-system ECUs 5-7, as well as application of power to the sub-microcomputer 22.

The main microcomputer 21 includes a CPU 31 for executing programs, a ROM 32 storing the programs, a RAM 33 storing the results of calculation made by the CPU 31, an I/O port 34, an internal timer 35 and an A/D converter (ADC) 36, providing a known configuration. In addition to this known configuration, the microcomputer 21 includes a main-microcomputer operation monitoring unit 37 (hereinafter just referred to as "main-microcomputer operation monitoring unit 37") which monitors whether or not the operation of the main microcomputer is in order. The I/O port 34 has a function of inputting various switch signals from outside, such as the start switch signal The I/O port 34 also has a function of detecting the fact that signals have been transmitted from the operation/input-system ECUs 8-10 via a communication line. Although not shown, the main microcomputer 21 is also provided with a communication control circuit for making communication with the operation/input-system ECUs 8-10.

The CPU 31 of the main microcomputer 21 executes the programs in the ROM 32. As a result, the microcomputer 21 functions as a power control circuit 31a that controls application of power to other ECUs 2-7 mentioned above and the sub-microcomputer 22. At the same time, the microcomputer 21 also functions as a first sub-microcomputer operation monitoring unit 31b that monitors whether or not the operation of the sub-microcomputer 22 is in order.

On the other hand, the sub-microcomputer 22 transfers/receives information to/from the main microcomputer 22 via an internal communication line. At the same time, the microcomputer 22 communicates with the travel-system ECUs 5-7 to control these ECUs, so that the engine and the electric motor can be controlled and that the battery charges can be controlled.

The sub-microcomputer 22 includes a CPU 41 that executes programs, a ROM 42 storing the programs, a RAM 43 storing the results of calculation made by the CPU 41 and an I/O port 44, providing the known configuration. In addition to the known configuration, the microcomputer 22 includes: an AND circuit 46 whose output becomes low when a low level, or an active level, has been reached by at least either reset signal C3a from the main microcomputer 21 or reset signal C3b from the power circuit 21; and a reset circuit 45 that resets the sub-microcomputer 22 when the output of the AND circuit 46 turns from a high level to a low level.

In other words, the sub-microcomputer 22 is configured to be reset according to the logical sum of the reset signal C3a at a low level (active level) from the main microcomputer 21 and the reset signal C3b at a low level (active level) from the power circuit 23. Although not shown, the sub-microcomputer 22 is also provided with a communication circuit for making communication with the travel-system ECUs 5-7.

The sub-microcomputer 22 is adapted to output a watchdog clear signal WDC (Watchdog Control), i.e. a signal to be monitored, to the main microcomputer 21 and the power circuit 23 within every predetermined time interval. The watchdog clear signal WDC is outputted with a periodical execution of a specific command in the program by the CPU 41 of the sub-microcomputer 22. In the present embodiment, as shown at the third stage of FIG. 3, the output level of the watchdog clear signal WDC is reversed at every predetermined pulse width time Twdc (1 ms in the present embodiment).

The power circuit 23 is provided with a regulator 51. The regulator 51 is configured to reduce the battery voltage V1 constantly supplied from the battery, and then produce power voltage (5 V in the present embodiment, hereinafter referred to as a "main microcomputer power voltage", or simply as a "power voltage") V3 for predetermined actuation of the main microcomputer 21. At the same time, the regulator 51 also produces power voltage (5 V in the present embodiment, hereinafter referred to as a "sub-microcomputer power voltage", or simply as a "power voltage") V4 for predetermined actuation of the sub-microcomputer 22.

Of the power voltages V3, V4 for the above two systems, only the power voltage V3 for the main microcomputer is outputted by the regulator 51 when the main microcomputer 21 is not in the state of outputting power control signal C1 for main microcomputer (hereinafter just referred to as "power control signal C1") to the power circuit 23.

In this case, the operation mode for outputting the power voltage V3 is a low-power output mode where output electric energy is small (or where current that can be outputted is small). Thus, the output electric energy of the power voltage V3 is limited to minimum electric energy enabling actuation of the I/O port 34 and the internal timer 35 in the main microcomputer 21.

When the main microcomputer 21 is in the state of outputting the power control signal C1, the regulator 51 outputs the power voltages V3, V4 for the two systems. In this case, the operation mode for outputting the power voltage V3 for the main microcomputer turns to a large-power output mode where output electric energy is large. Specifically, in the large-power output mode, the output electric energy of the power voltage V3 turns to the electric energy which enables actuation of all the units in the main microcomputer 21.

Also, the power circuit 23 is provided with a switch 52. The switch 52 is turned on when power control signal C2 for the sub-microcomputer (hereinafter just referred to as "power control signal C2") is being outputted from the main microcomputer 21, so that the power voltage V4 outputted from the regulator 51 can be supplied to the sub-microcomputer 22.

Alternatively, it may be so configured that the switch 52 supplies the power voltage V3 outputted from the regulator 51 to the so sub-microcomputer 22, so as to serve as the power voltage V4. In this case, the output electric energy of the power voltage V3 in the large-power output mode of the regulator 51 may be set to an electric energy which enables actuation of all the units in the primary and sub-microcomputers 21 and 22.

The power circuit 23 also includes an IG drive circuit 53, an OR circuit 54 and a primary relay drive circuit 55. The IG drive circuit 53 is configured to turn on the IG relay 11 upon output of a power relay drive command C5 from the main microcomputer 21. The OR circuit 54 is configured to output a logical sum signal resulting from the power relay drive command C5 and a main relay drive command C6 outputted from the sub-microcomputer 22. The main relay drive circuit 55 is configured to turn on the main relay 12 if the output of the OR circuit 54 has reached the active level (i.e. if either the power relay drive command C5 has been outputted from the main microcomputer 21, or the main relay drive command C6 has been outputted from the sub-microcomputer 22).

Further, the power circuit 23 includes a circuit configured to monitor whether or not the operation of the sub-microcomputer 22 is in order. This circuit serves as a second sub-microcomputer operation monitoring unit 57, to which the watchdog clear signal WDC from the sub-microcomputer 22 is inputted.

In particular, the second sub-microcomputer operation monitoring unit 57 serves as a so-called watchdog timer (WDT) circuit which outputs the reset signal C3b having a predetermined time width to the sub-microcomputer 22, unless the timer value is reset by the watchdog clear signal WDC from the microcomputer 22, within every predetermined monitoring time Tw2 (or unless the watchdog clear signal WDC from the microcomputer 22 is inputted for the duration of the monitoring time Tw2 or more). The second sub-microcomputer operation monitoring unit 57 is ensured to operate only when a startup signal INIT, which will be described later, outputted from the sub-microcomputer 22 are being received.

In the present embodiment, a timer of the second sub-microcomputer operation monitoring unit 57 is ensured to be reset in the falling edge of the watchdog clear signal WDC. Also, the monitoring time Tw2 mentioned above is set to 20 ms, for example.

In the electronic control unit 1, the sub-microcomputer 22, when it is started upon receiving the power voltage V4 from the power circuit 23, is adapted to output the startup signal INIT to the power circuit 23 (specifically, the second sub-microcomputer operation monitoring unit 57). The startup signal INIT is outputted during the period from the start of the microcomputer 22 up to the point when the microcomputer 22, per se, determines its being in a state where its operation can be stopped, or up to the point when supply of the power voltage V4 is shut off. In other words, the startup signal INIT serve as a signal which indicates that the sub-microcomputer 22 is in operation, and thus correspond to high active signals in the present embodiment.

When the sub-microcomputer 22, per se, determines its being is in a state where its operation can be stopped, the microcomputer 22 is adapted to output a power shut-off enabling signal C4 to the main microcomputer 21. In the present embodiment, the power shut-off enabling signal C4 correspond to a port signal outputted from an output port of the sub-microcomputer 22.

A signal line extending from the output port to the main microcomputer 21, for outputting the power shut-off enabling signal C4 is connected, via a resistor 60, to a non-active-side voltage (high-level voltage in the present embodiment, i.e. the power voltage V4 outputted from the power circuit 23 to the sub-microcomputer 22), which is a voltage that does not permit power shutoff. In other words, the signal line of the power shut-off enabling signal C4 is being pulled up to the power voltage V4, a high-level voltage, by the resistor 60.

Referring now to FIG. 2, hereinafter is described the operation of the electronic control unit 1.

As shown, prior to a time t1 (left side as viewed in the figure), the electronic control unit 1 is in a state where the battery voltage V1 has only been fed. In this state, the main microcomputer 21 is in a waiting mode where the internal I/O port 34 and the internal timer 35 alone are in operation.

In the waiting mode, the main microcomputer 21 outputs neither the power control signal C1 nor the power control signal C2. In the present embodiment, because of being high active signal, the power control signals C1, C2 become low in the waiting mode.

Accordingly, the power voltage V4 is not supplied from the power circuit 23 to the sub-microcomputer 22 (i.e. V4=0V). Also, although the power voltage V3 is supplied from the power circuit 23 to the main microcomputer 21, the operation mode, in the power circuit 23, of the regulator 51 that outputs the power voltage V3 turns to the low-power output mode (indicated as a "low-current mode" in FIG. 2) mentioned above.

Thus, the sub-microcomputer 22 stops operation without consuming power at all. Also, in the main microcomputer 21 as well, the I/O port 34 and the internal timer 35 alone, which detect whether or not the startup conditions have been met, are in operation to thereby minimize the power consumption. Thus, in addition, the power consumption of the regulator 51 is also minimized.

This state is the waiting state of the electronic control unit 1. As exemplified at the bottom stage of FIG. 2, current consumption (so-called "dark current") of the entire electronic control unit 1 in this state is about 2 mA.

As indicated at the time t1, the startup conditions may be met when signals are transmitted to the electronic control unit 1 from the operation/input-system ECUs 8-10, or when some switch signals, such as the start switch signal, inputted to the electronic control unit 1 have turned to an active level. Then, when the startup conditions have been met, this fact may be detected by the I/O port 34, upon which the main microcomputer 21 outputs the power control signal C1 to the power circuit 23.

Then, the operation mode of the regulator 51 in the power circuit 23 turns from the low-power output mode to the large-power output mode (indicated as a "normal-current mode" in FIG. 2), while the main microcomputer 21 turns from the waiting mode to a normal operation mode where all the units inside are in operation.

When the main microcomputer 21 has turned to the normal operation mode, the CPU 31 executes the programs to govern the operation of the main microcomputer 21. The operations of the main microcomputer 21 in the normal operation mode, which will be described below, are realized with the execution of the programs by the CPU 31.

In this state, of the microcomputers 21, 22, the microcomputer 21 alone will be in normal operation. As exemplified at the bottom stage of FIG. 2, the current consumption of the entire electronic control unit 1 will be about 100 mA. The startup conditions, which promise the start of the main microcomputer 21 from the waiting mode, include not only the condition where the communication signals or the switch signals have been inputted from the operation/input-system ECUs 8-10, but also a condition where, for example, the time count of a quiescent time has been completed by the internal timer 35.

The main microcomputer 21 that has started from the waiting mode and has turned to the normal operation mode carries out the following processes with the functioning of the CPU 31 as the power control unit 31a.

First, the main microcomputer 21 determines whether or not an ignition ON condition that is to turn on an ignition system power in the vehicle, has been met. This determination is made based on input signals including the communication signals from the operation/input-system ECUs 8-10 and various switch signals from outside.

For example, the ignition ON condition is determined as having met when it is determined, based on the start switch signal, that specific operation has been performed for the start switch, and when it is verified that the check data from the remote key that has been received from the remote ECU 9 indicates the authorized user's remote key.

The microcomputer 21, if it determines that the ignition ON condition has not been met, performs processes in response to the input signals of the time. After that, the microcomputer 21 stops the output of the power control signal C1 and returns to the waiting mode from the normal operation mode.

Meanwhile, if the main microcomputer 21 determines that the ignition ON condition has been met, the microcomputer 21 outputs the power relay drive command C5 of a high level (active level) to the power circuit 23, as shown at time t2.

In response, the IG drive circuit 53 turns on the IG relay 11 to supply the power voltage VIG that is the ignition system power supply to the display-system ECUs 2-4. The power relay drive command C5 from the main microcomputer 21 is also transmitted to the main relay drive circuit 55 via the IG drive circuit 53 and the OR circuit 54 to permit the main relay drive circuit 55 to turn on the main relay 12. In this way, the power voltage V2 is supplied to the travel-system ECUs 5-7 which are controlled by the sub-microcomputer 22.

Further, the main microcomputer 21 starts monitoring the power voltage V2 using the A/D converter 36, which power voltage is supplied to the travel-system ECUs 5-7 from the main relay 12. Then, when the power voltage V2 supplied to the travel-system ECUs 5-7 has been kept at a threshold Vth1 or more for a certain duration of time or more (i.e. when the ignition ON condition has been met and when the power voltage V2 has been reliably supplied to the travel-system ECUs 5-7), the main microcomputer 21 determines to actuate the sub-microcomputer 22. Then, as indicated at time t3, the main microcomputer 21 outputs the power control signal C2 to the power circuit 23.

Then, the power voltage V4 is supplied to the sub-microcomputer 22 from the power circuit 23 to permit the sub-microcomputer 22 to start up. It should be appreciated that the threshold Vth1 is set to a voltage value which can reliably actuate the travel-system ECUs 5-7.

In this way, the power voltage V4 is fed to the sub-microcomputer 22 after the power voltage V2 has been fed to the travel-system ECUs 5-7. At this stage, both of the microcomputers 21, 22 are brought to the actuated state, and the power consumption of the entire electronic control unit 1 at this stage will be about 300 mA as indicated at the bottommost stage of FIG. 2. Upon supply of the power voltage V4 to the sub-microcomputer 22, the CPU 41 carries out the programs to govern the operation of the sub-microcomputer 22. The operations of the sub-microcomputer 22, which will be described below, are realized with the execution of the programs by the CPU 41.

When the sub-microcomputer 22 starts operating, the level of the power shut-off enabling signal C4 is turned high on the non-active side (non-enabling side), as indicated at time t4. At the same time, the outputting of the startup signal INIT is started for the second sub-microcomputer operation monitoring unit 57 in the power circuit 23. Further, as indicated at time t5, the sub-microcomputer 22 outputs the main relay drive command C6 of high level (active level) to the power circuit 23. This is because the on-state of the main relay 12 can be maintained, if the level of the power relay drive command C5 from the main microcomputer 21 becomes low.

After that, the sub-microcomputer 22 detects the operation conditions of the accelerator and the brake based on the driver's operation signals inputted from outside the electronic control unit 1. Based on the results of the detection, the microcomputer 22 calculates target values of the torque that should be outputted from the engine and the electric motor and a target value of battery charge, and transmits these target values to the ECUs 5-7. Then, the ECUs 5-7 control the individual objects to be controlled (i.e. the engine, the electric motor and the battery charger) based on the target values transmitted from the sub-microcomputer 22. In this way, the sub-microcomputer 22 controls the engine and the electric motor and also controls battery charges via the travel-system ECUs 5-7.

When the sub-microcomputer 22 determines that the vehicle is in the state where control of the travel-system ECUs 5-7 is no longer needed (i.e. the state where the motive power of the vehicle can be stopped), the sub-microcomputer 22 stops the output of the main relay drive command C6, as indicated at time t7.

For example, when the driver operates the start switch to command turning off of the ignition system power supply (e.g. when the driver presses the start switch twice in a predetermined time interval), the sub-microcomputer 22 detects this operation based on the information from the main microcomputer 21. Then, the sub-microcomputer 22 transmits a command for stopping braking operation to the ECUs 5-7. Then, confirming that all the processes have been completed by the ECUs 5-7, the sub-microcomputer 22 determines that the vehicle is in the state where control of the travel-system ECUs 5-7 is no longer needed.

The main microcomputer 21, when it detects that the driver has operated the start switch to command turning off of the ignition system power supply, stops the output of the power relay drive command C5 at that point. Therefore, as indicated at time t6, the level of the power relay drive command C5 becomes low before the sub-microcomputer 22 stops the output of the main relay drive command C6. Thus, when the sub-microcomputer 22 stops the output of the main relay drive command C6, the main relay 12 is turned off to shut off power supply to the travel-system ECUs 5-7.

After that, during the operation stop period as well, the sub-microcomputer 22 continues writing data to be stored, such as learned values and results of fault diagnosis, into the external storage unit 25. Upon completion of the data writing, the sub-microcomputer 22 determines that the vehicle is in the state where the operation of the microcomputer 22, per se, is no longer needed. Then, as indicated at time t8, the sub-microcomputer 22 outputs the power shut-off enabling signal C4 to the main microcomputer 21 (i.e. turns the output level of the power shut-off enabling signal C4 to a low level on the active side), while stopping the output of the startup signal INIT.

Let us assume that the main microcomputer 21 has determined that the power voltage V2 to the travel-system ECUs 5-7 monitored using the A/D converter 36 has become equal to or less than a threshold Vth2 and that such a state has been continued for a predetermined time or more. At the same time, let us assume that the main microcomputer 21 has detected that the level of the power shut-off enabling signal C4 from the sub-microcomputer 22 has become low. In such a case, the main microcomputer 21 stops, as indicated at time t9, the output of the power control signal C2 to the power circuit 23.

It should be appreciated that the threshold Vth2 is set to a voltage value that can disable the actuation of the travel-system ECUs 5-7.

Then, the power voltage V4 is no longer outputted from the power circuit 23 to the sub-microcomputer 22 to stop the operation of the sub-microcomputer 22. As a result, control returns to the state where, of the microcomputers 21, 22, the main microcomputer 22 alone is in operation.

After that, the main microcomputer 21 determines that the vehicle is in the state where the microcomputer 21, per se, is no longer needed to be operated, upon satisfaction of such conditions as: the various switch signals are no longer inputted; the communication signals are no longer received from other ECUs 8-10; and the processes of writing data, such as learned values and results of fault diagnosis, into the external storage unit 24 have been completed.

Then, as indicated at time t10, the main microcomputer 21 stops the output of the power control signal C1 to the power circuit 23 to change the operation mode of the regulator 51 of the power circuit 23 from the large-power output mode to the low-power output mode. In addition, the main microcomputer 21 changes the operation mode of itself from the normal operation mode to the waiting mode where the operation is substantially stopped. As a result, the electronic control unit 1 returns to the waiting state which is similar to the state right after the feeding of the battery voltage V1.

On the other hand, in the electronic control unit 1, the main-microcomputer operation monitoring unit 37 in the main microcomputer 21 serves as a so-called watchdog timer (WDT) circuit which resets the main microcomputer 21 unless the CPU 31 is reset within every predetermined monitoring time. The main-microcomputer operation monitoring unit 37 operates only when the power control signal C1 is outputted to the power circuit 23 from the main microcomputer 21. Thus, when the main microcomputer 21 is in the waiting mode where its operation is stopped, an erroneous determination of malfunction cannot be made, which would otherwise have been made by monitoring the operation of the main microcomputer 21.

The first sub-microcomputer operation monitoring unit 31b, which is realized with the execution of the programs by the CPU 31 of the main microcomputer 21, also serves as a so-called watchdog timer (WDT) which outputs the reset signal C3a of a predetermined time width to the sub-microcomputer 22, unless the timer value is reset by the watchdog clear signal WDC from the sub-microcomputer 22 within every predetermined monitoring time Tw1 (i.e. unless the watchdog clear signal WDC from the sub-microcomputer 22 are inputted for the so duration of, at least, the monitoring time Tw1).

The first sub-microcomputer operation monitoring unit 31b is adapted to function only when the power control signal C2 is outputted from the main microcomputer 21 to the power circuit 23. Thus, when the power voltage V4 is not being supplied to the sub-microcomputer 22 (i.e. when the sub-microcomputer 22 is not in operation), an erroneous determination of malfunction cannot be made, which would otherwise have been made by monitoring the operation of the sub-microcomputer 22.

In the present embodiment, similar to the second sub-microcomputer operation monitoring unit 57 in the power circuit 23, the first sub-microcomputer operation monitoring unit 31b in the main microcomputer 21 is adapted to be reset in the falling edge of the watchdog clear signal WDC. Also, the monitoring time Tw1 mentioned above of the main microcomputer 21 is set shorter, e.g. to 12 ms, than the monitoring time Tw2 (~20 ms) in the second sub-microcomputer operation monitoring unit 57.

In the electronic control unit 1 described above, the second sub-microcomputer operation monitoring unit 57 set up in the power circuit 23 is adapted to monitor the operating state of the sub-microcomputer 22, and also, the main microcomputer 21 is adapted to monitor the operating state of the sub-microcomputer 22.

Let us assume, as shown in FIG. 3, that the microcomputer 22 has started at time "ta", the programs have run out of control afterwards at time "tb" in the sub-microcomputer 22, and the watchdog clear signal WDC are no longer outputted from the sub-microcomputer 22 (i.e. falling edge no longer occurs in the signal WDC). In this case, from time "tb" to time "tc" when the monitoring time Tw1 (=12 ms) has expired in the main microcomputer 21, the reset signal C3a of low level are outputted from the main microcomputer 21 to the sub-microcomputer 22 to attempt return to the normal state of the sub-microcomputer 22.

Then, in the sub-microcomputer 22, the reset signal C3a of low level are inputted to the reset circuit 45 via the AND circuit 46. Then, normally, the sub-microcomputer 22 is reset (initialized) and returns to the normal state to thereby resume outputting of the watchdog clear signal WDC. It should be appreciated that, in FIG. 3, the period between time "tc" and time "td" corresponds to the period when the reset signal C3a are at a low level.

Meanwhile, any malfunction may possibly occur in the main microcomputer 21 to disable the main microcomputer 21 from outputting the reset signal C3a. In such a case, the reset signal C3b of low level are outputted from the second sub-microcomputer operation monitoring unit 57 of the power circuit 23 to the sub-microcomputer 22 when the monitoring time Tw2 (=20 ms) has passed in the second monitoring circuit 57 since time "tb" when the issuance of the watchdog clear signal WDC have stopped. Thus, an attempt is made to have the sub-microcomputer 22 returned to the normal state.

On the contrary, in the case where malfunction has occurred in the second sub-microcomputer operation monitoring unit 57 of the power circuit 23, the sub-microcomputer 22 will be monitored by the main microcomputer 21.

According to the electronic control unit 1 described above, a dual monitoring system can be established without the necessity of providing two circuits, each functioning similar to the second sub-microcomputer operation monitoring unit 57, for the sub-microcomputer 22 which controls important travel functions in the vehicle. Thus, the sub-microcomputer 22 in a malfunctioning state can be prevented from controlling the travel functions, while the increase in the number of circuits can be suppressed. In this way, reliability of the vehicle can be enhanced.

Further, in the present embodiment, the monitoring time Tw1 in the main microcomputer 21 is not the same as the monitoring time Tw2 in the second sub-microcomputer operation monitoring unit 57, but different values are set to the monitoring times to establish a relationship of "Tw1<Tw2".

Accordingly, if the programs have run out of control in the sub-microcomputer 22 to disable outputting of the watchdog clear signal WDC, the reset signal C3a are output first from the main microcomputer 21 having shorter monitoring time. If, nevertheless, the sub-microcomputer 22 is disabled from returning to the normal state, the reset signal C3b will be outputted from the second sub-microcomputer operation monitoring unit 57 having longer monitoring time. In this way, the sub-microcomputer 22 can be imparted with the reset signal from both of the main microcomputer 21 and the second sub-microcomputer operation monitoring unit 57 of the sub-microcomputer 22 with a certain time lag. AS a result, the sub-microcomputer 22 will have more chance of returning to the normal state.

As mentioned above, the relationship "Tw1<Tw2" is ensured to be established. Therefore, irrespective of the occurrence of malfunction in the main microcomputer 21, a concept can be realized, that is, a concept of permitting the second sub-microcomputer operation monitoring unit 57 of a hardware circuit, which is considered to have less probability of causing malfunction, to reliably play a role of monitoring and resetting the sub-microcomputer 22.

Also, in the electronic control unit 1 of the present embodiment, the main microcomputer 21 monitoring the sub-microcomputer 22 controls power supply to the sub-microcomputer 22. Thus, in the absence of the supply of the power voltage V4 to the sub-microcomputer 22, the main microcomputer 21 cannot make an erroneous determination on malfunction of the sub-microcomputer 22. This is because, as described above, the main microcomputer 21 is ensured to monitor the operation of the sub-microcomputer 22 only when the power control signal C2 are being outputted to the power circuit 23. Thus, such a disadvantage of making an erroneous determination can be easily avoided.

Further, the second sub-microcomputer operation monitoring unit 57 of the power circuit 23 is ensured to operate only during the reception of the startup signal INIT from the sub-microcomputer 22. Therefore, when the sub-microcomputer 22 is not in operation at all, the second sub-microcomputer operation monitoring unit 57 cannot also make an erroneous determination on malfunction of the sub-microcomputer 22. Thus, such a disadvantage of making an erroneous determination can be easily avoided. Also, when the operation of the sub-microcomputer 22 is stopped, the operation of the second sub-microcomputer operation monitoring unit 57 can also be stopped, thereby reducing the unnecessary current consumption of the second sub-microcomputer operation monitoring unit 57.

Although not having been explained above, in the electronic control unit 1 of the present embodiment, the main microcomputer 21 may resultantly output the reset signal C3a within a predetermined time for a predetermined number of times or more using the function as the first sub-microcomputer operation monitoring unit 31b (i.e. the watchdog clear signal WDC from the sub-microcomputer 22 may not resultantly be inputted for duration of time equal to or more than a predetermined integral multiple of the monitoring time Tw1). In such a case, the main microcomputer 21 determines that malfunction has occurred, which disables the sub-microcomputer 22 from returning to the normal state irrespective of the impartment of the reset signal. In this case, the main microcomputer 21 stops the output of the power control signal C2, regardless of the application of the power voltage V2 and the issuance of the power shut-off enabling signal C4.

In this way, if return to the normal state of the sub-microcomputer 22 cannot be achieved in spite of the repeated resetting, power supply to the sub-microcomputer 22 can be shut off to completely prevent the sub-microcomputer 22 from performing an undefined operation. Thus, the sub-microcomputer 22 in a malfunctioning state can be reliably prevented from controlling the travel functions of the vehicle, to thereby further enhance the reliability.

The function of forcibly shutting off the power supply to the sub-microcomputer 22 may also be imparted to the second sub-microcomputer operation monitoring unit 57 of the power circuit 23, or may be imparted to only the second sub-microcomputer operation monitoring unit 57. In this case, it may be so configured that, unless the watchdog clear signal WDC are inputted for duration of time equal to or more than a predetermined integral multiple of the monitoring time Tw2, the second sub-microcomputer operation monitoring unit 57 determines the sub-microcomputer 22 as being in a malfunctioning state, no longer being able to return to the normal state. The second sub-microcomputer operation monitoring unit 57 may then forcibly turn off the switch 52 in the power circuit 23.

Alternatively, the second sub-microcomputer operation monitoring unit 57 may be provided separately from the power circuit 23.

In the present embodiment, the sub-microcomputer 22 corresponds to the first microcomputer, the main microcomputer 21 corresponds to the second microcomputer, and the second sub-microcomputer operation monitoring unit 57 corresponds to the monitoring means. Also, the power circuit 23, the regulator 51 and the switch 52 correspond to the power supplying means for the first microcomputer.

Second Embodiment

Figure 4:
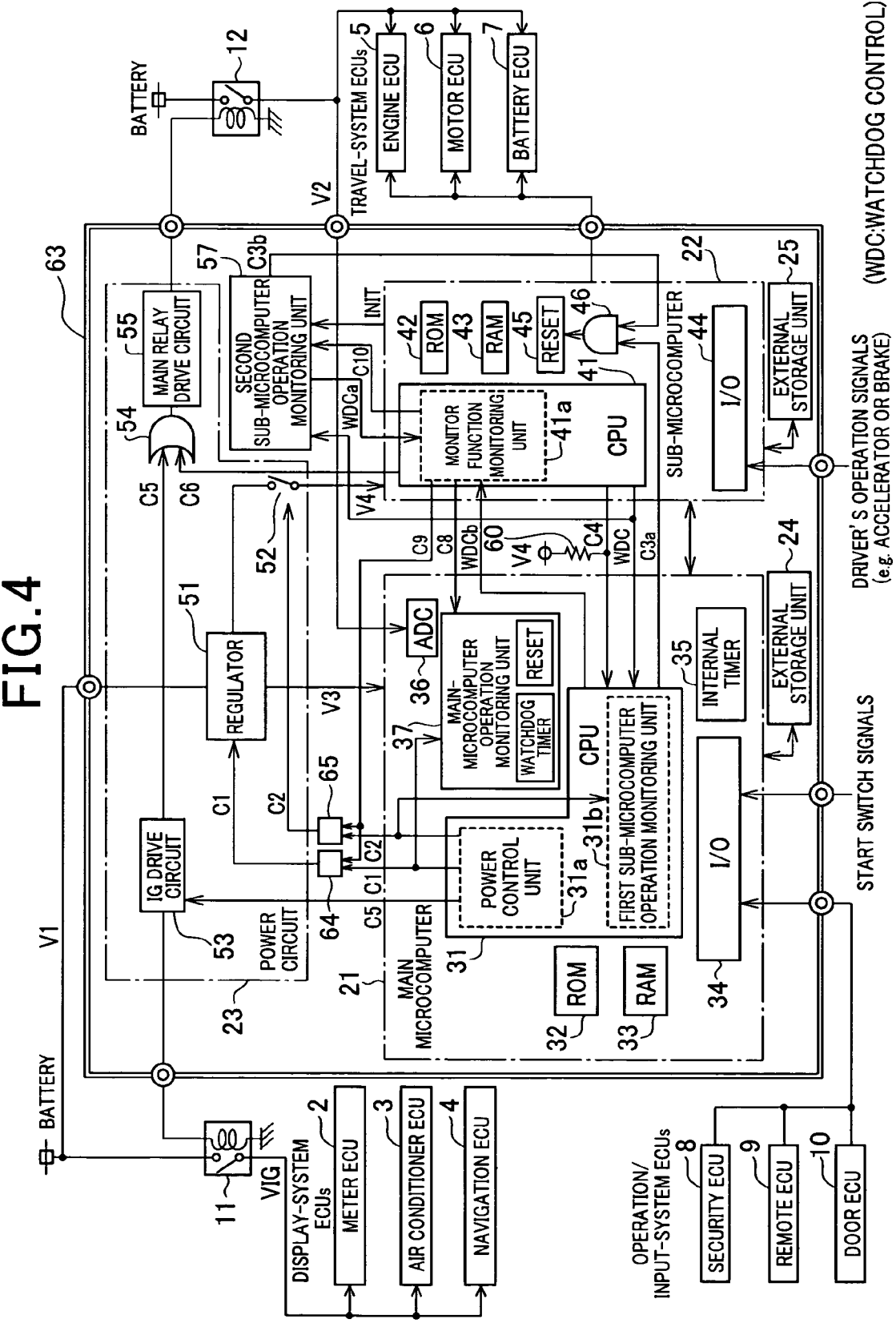
FIG. 4 is a schematic diagram illustrating an ECU, according to a second embodiment.

Referring now to FIG. 4, hereinafter is described a second embodiment of the present invention. In the second embodiment, the identical or similar components to those in the first embodiment are given the same reference numerals for the sake of omitting explanation.

FIG. 4 is a schematic diagram illustrating an electronic control unit 63 mounted in a vehicle, which is according to the second embodiment. The electronic control unit 63 serves as an electronic control apparatus according to the present invention.

The electronic control unit 63 of the second embodiment is different from the electronic control unit 1 of the first embodiment in the following points.

First, the second sub-microcomputer operation monitoring unit 57 is provided separately from the power circuit 23.

Also, when being operated receiving the startup signal INIT from the sub-microcomputer 22, the second sub-microcomputer operation monitoring unit 57 is adapted to output a watchdog clear signal WDCa, as a signal to be monitored, to the sub-microcomputer 22 within every predetermined time interval. The watchdog clear signal WDCa correspond to the signal whose output level is reversed every time the timer for counting the above monitoring time Tw2 counts a predetermined time (e.g. 1 ms) In the second sub-microcomputer operation monitoring unit 57.

Accordingly, when malfunction has occurred at the timer to disable counting of the monitoring time Tw2 (and thus, monitoring of the operation of the sub-microcomputer 22), the output of the watchdog clear signal WDCa to the sub-microcomputer 22 is resultantly stopped. Also, the second sub-microcomputer operation monitoring unit 57 is adapted to be reset by reset signal C10 from the sub-microcomputer 22.

With the periodical execution of particular commands in the programs by the CPU 31, the main microcomputer 21 is also adapted to output a watchdog clear signal WDCb, as a signal to be monitored, to the sub-microcomputer 22 within every predetermined time interval. The output level of the watchdog clear signal WDCb is also reversed every 1 ms, for example. In the main microcomputer 21, upon reception of reset signal C8 from the sub-microcomputer 22, the main-microcomputer operation monitoring unit 37 resets the main microcomputer 21.

The sub-microcomputer 22 is provided with a monitor function monitoring unit 41a that monitors whether or not the operation of the main microcomputer 21 and the second sub-microcomputer operation monitoring unit 57 is in order. The monitor function monitoring unit 41a corresponds to the functioning means which is realized by the execution of the programs by the CPU 41.

The monitor function monitoring unit 41a of the sub-microcomputer 22 has a function as a watchdog timer (WDT) for the main microcomputer 21 and the second sub-microcomputer operation monitoring unit 57.

Specifically, the monitor function monitoring unit 41a outputs the reset signal C8 of a predetermined time width to the main microcomputer 21, unless the watchdog clear signal WDCb from the main microcomputer 21 are inputted for duration of time equal to or more than a predetermined monitoring time Twb (e.g. 12 ms). More specifically, the reset signal C8 are outputted if, for example, duration of time, in which no falling edge occurs in the watchdog clear signal WDCb, becomes equal to or more than the monitoring time Twb.

Similarly, the monitor function monitoring unit 41a also outputs the reset signal C10 of a predetermined time width to the second sub-microcomputer operation monitoring unit 57, unless the watchdog clear signal WDCa from the second sub-microcomputer operation monitoring unit 57 are inputted for duration of time equal to or more than a predetermined monitoring time Twa (e.g. 12 ms).

Upon detection of malfunction in either the main microcomputer 21 or the second sub-microcomputer operation monitoring unit 57, the monitor function monitoring unit 41a informs the units outside the so electronic control unit 63 (e.g., other ECUs 5-7) of the malfunction, while storing the occurrence of the malfunction, as history, in the external storage unit 25.

The monitor function monitoring unit 41a may resultantly output the reset signal C8 to the main microcomputer 21 within a predetermined time interval for a predetermined number of times or more (i.e. the watchdog clear signal WDCb from the main microcomputer 21 may not resultantly be inputted for duration of time equal to or more than a predetermined integral multiple of the monitoring time Twb). In such a case, the monitor function monitoring unit 41a determines that the main microcomputer 21 has been brought into a malfunctioning state, being disabled from returning to the normal state in spite of the resetting operation.

Similarly, the monitor function monitoring unit 41a may resultantly output the reset signal C10 to the second sub-microcomputer operation monitoring unit 57 within a predetermined time interval for a predetermined number of times or more (i.e. the watchdog clear signal WDCa from the second sub-microcomputer operation monitoring unit 57 may not resultantly be inputted for duration of time equal to or more than a predetermined integral multiple of the monitoring time Twa). In such a case, the monitor function monitoring unit 41a determines that the second sub-microcomputer operation monitoring unit 57 has been brought into a malfunctioning state, being disabled from returning to the normal state in spite of the resetting operation.

Determining that the main microcomputer 21 and the second sub-microcomputer operation monitoring unit 57 are both in a malfunctioning state, being disabled from returning to the normal state, the monitor function monitoring unit 41a outputs a power stop signal C9. In the present embodiment, the power stop signal C9 is of high level (active level).

In the electronic control unit 63, two logic circuits 64, 65 are so additionally provided to the signal paths of the power control signals C1, C2, respectively, extending from the main microcomputer 21 to the power circuit 23.

When the power control signal C1 from the main microcomputer 21 turns to a high level from a low level, the logic circuit 64 outputs the high power control signal C1 to the power circuit 23. After that, when the level of the power control signal C1 from the main microcomputer 21 turns to low, or when the level of the power stop signal C9 from the sub-microcomputer 22 turns to high, the logic circuit 64 turns the level of the power control signal C1 outputted to the power circuit 23 from high to low.

Similarly, when the power control signal C2 from the main microcomputer 21 turn to a high level from a low level, the logic circuit 65 outputs the high power control signal C2 to the power circuit 23. After that, when the level of the power control signal C2 from the main microcomputer 21 turns to low, or when the level of the power stop signal C9 from the sub-microcomputer 22 turns to high, the logic circuit 65 turns the level of the power control signal C2 outputted to the power circuit 23 from high to low.

As a result, in the case where the main microcomputer 21 and the second sub-microcomputer operation monitoring unit 57 are both in malfunction to have the sub-microcomputer 22 outputted the power stop signal C9, supply of the power voltages V3, V4 to the microcomputers 21, 22, respectively, is forcibly stopped. As for the power voltage V3, or its output electric energy, in particular, the value will be reduced so small that the main microcomputer 21 is disabled from its normal operation.

According to the electronic control unit 63 described above, the sub-microcomputer 22 can confirm that power management and operation monitoring are being performed by the main microcomputer 21 in normal operation. Similarly, the sub-microcomputer 22 can also confirm that operation monitoring is being performed by the second sub-microcomputer operation monitoring unit 57 in normal operation.

If either of the main microcomputer 21 and the second sub-microcomputer operation monitoring unit 57 is in malfunction, return to the normal state can be attempted by Imparting the reset signal C8, C10 to the malfunctioning component in question from the sub-microcomputer 22, whereby reliability of the electronic control unit 63 can be enhanced.

When both of the main microcomputer 21 and the second sub-microcomputer operation monitoring unit 57 are disabled return to the normal state to leave the sub-microcomputer 22 without being monitored, the power supply to both of the microcomputers 21, 22 is forcibly stopped. Thus, it is possible to reliably prevent, in advance, the sub-microcomputer 22 that might be in malfunction from affecting control of travel functions. In this way, the reliability of the vehicle can be further enhanced.

In the present embodiment, power supply to both of the microcomputers 21, 22 has been ensured to be shut off by the power stop signal C9. Alternatively, the logic circuit 64 may be removed, so that power supply to only the sub-microcomputer 22 can be shut off by the power stop signal C9.

In the present embodiment, the monitor function monitoring unit 41a corresponds to the monitor function monitoring means. In other words, the sub-microcomputer 22 of the present embodiment has been configured to function as the monitor function monitoring means. Alternatively, a circuit having the same function as the monitor function monitoring unit 41a may be provided separately from the sub-microcomputer 22.

Some embodiments of the present invention have been described so far. As a matter of course, the present invention is not intended to be limited to the above embodiments, but may be implemented in various other embodiments without departing from the spirit of the invention.

For example, the method for monitoring the sub-microcomputer 22 may be different between the main microcomputer 21 (second microcomputer) and the second sub-microcomputer operation monitoring unit 57 (monitoring means).

As a specific example, the second sub-microcomputer operation monitoring unit 57 may carry out monitoring, as described above, based on the watchdog clear signal WDC from the sub-microcomputer 22. On the other hand, concurrently with the execution of the same specific processes as the sub-microcomputer 22, the main microcomputer 21 may receive the results of the specific processes from the sub-microcomputer 22, may compare the results with the results of the processes performed by itself, and then, when both of the results match with each other, may determine the sub-microcomputer 22 as being in malfunction. In this way, the monitoring methods may be differentiated from each other.

Alternatively, the main microcomputer 21 may be configured to carry out monitoring based on both the watchdog clear signal WDC from the sub-microcomputer 22, and the different method mentioned just above.

Alternatively, the control effected by the sub-microcomputer 22 may not be limited to the controls associated with the travel functions, but may be other controls, such as the control associated with steering of the wheels or the control associated with braking.

Also, the number of microcomputers may be two or more.

In the embodiments described above, the main microcomputer 21 is adapted to detect whether or not startup conditions have been met in the waiting mode. In other words, the main microcomputer 21 has been provided therein with the starting means which detects the establishment of the startup conditions to output the power control signal C1 to the power circuit 23, while starting the main microcomputer 21. Alternatively, the circuit that serves as such so starting means may be provided separately from the main microcomputer 21. However, the configurations described in the above embodiments may be more advantageous because these configurations can more downsize the electronic control apparatus.

What is claimed is:

1. An electric control apparatus for a vehicle, comprising:
   at least two microcomputers composed of at least a first microcomputer and a second microcomputer, the first microcomputer being assigned to controlling travel functions of a vehicle;
   an external monitoring unit that monitors whether or not the first microcomputer is in a normal operation, wherein the external monitoring unit is placed outside the first and second microcomputers; and
   an internal monitoring means that monitors whether or not the first microcomputer is in a normal operation, wherein the internal monitoring means is within the first microcomputer;
   the first microcomputer comprises output means that outputs a monitoring signal to the internal monitoring means and the external monitoring unit at intervals which are set within a given period of time, the monitoring signal being for allowing both of the internal monitoring means and the external monitoring unit to monitor the operations of the first microcomputer; and
   each of the second microcomputer and the external monitoring unit is formed to output a reset signal to the first microcomputer when the monitoring signal has not been provided from the first microcomputer for a given period of monitoring time, the reset signal resetting the operations of the first microcomputer;

wherein the internal monitoring means is given a monitoring time which is set to monitor the operations of the first microcomputer and the external monitoring unit is given a further monitoring time monitor to monitor the operations of the first microcomputer, the monitoring time given to the internal monitoring means being different from the further monitoring time given to the external monitoring unit;

wherein the further monitoring time given to the external monitoring unit is longer than the monitoring time given to the internal monitoring means.

2. The apparatus of claim 1, comprising a power supply unit is that supplies power-supply voltage to the first microcomputer in response to a power control signal, the power-supply voltage starting up the first microcomputer, wherein the second microcomputer comprises determining means that determines whether or not the first microcomputer needs to start up, and switching means that switches over between an output action and a non-output action of the power control signal to be given to the power supply unit based on results determined by the determining means as to starting up the first microcomputer.

3. The apparatus of claim 1, wherein the first microcomputer comprises providing means that provides the external monitoring unit with an operation signal showing that the first microcomputer is in operation, and the external monitoring unit is formed to monitor operations of the first microcomputer during reception of the operation signal.

4. An electric control apparatus for a vehicle, comprising:

at least two microcomputers composed of at least a first microcomputer and a second microcomputer, the first microcomputer being assigned to controlling travel functions of a vehicle;

an external monitoring unit that monitors whether or not the first microcomputer is in a normal operation, wherein the external monitoring unit is placed outside the first and second microcomputers; and an internal monitoring means that monitors whether or not the first microcomputer is in a normal operation, wherein:

the internal monitoring means is within the first microcomputer;

the first microcomputer comprises output means that outputs a monitoring signal to the internal monitoring means and the external monitoring unit at intervals which are set within a given period of time, the monitoring signal being for allowing both of the internal monitoring means and the external monitoring unit to monitor the operations of the first microcomputer; and each of the second microcomputer and the external monitoring unit is formed to output a reset signal to the first microcomputer when the monitoring signal has not been provided from the first microcomputer for a given period of monitoring time, the reset signal resetting the operations of the first microcomputer; each of the internal monitoring means and the external monitoring unit comprises determining means for determining whether or not the first microcomputer is in a disabled state in which no return of the first microcomputer to a normal state thereof is expected even if the reset signal is given the first microcomputer, and stopping means for making the power supply unit stop supplying the power-supply voltage to the first microcomputer based on the determination by the determining means.

5. The apparatus of claim 1, wherein a the first microcomputer comprises means for monitoring whether or not the second microcomputer is in a normal operation.

6. The apparatus of claim 5, wherein the second microcomputer comprises outputting means that outputs a monitoring signal to the first microcomputer at intervals which are set within a given period of time, the monitoring signal being for allowing the first microcomputer to monitor operations of the second microcomputer and the first microcomputer is formed to output a reset signal to the second microcomputer when the monitoring signal has not been provided from the second microcomputer for a given period of monitoring time, the reset signal resetting the operations of the second microcomputer.

7. An electric control apparatus for a vehicle, comprising:

at least two microcomputers composed of at least a first microcomputer and a second microcomputer, the first microcomputer being assigned to controlling travel functions of a vehicle;

an external monitoring unit that monitors whether or not the first microcomputer is in a normal operation, wherein the external monitoring unit is placed outside the first and second microcomputers; and an internal monitoring means that monitors whether or not the first microcomputer is in a normal operation, wherein the internal monitoring means is within the first microcomputer;

a power supply unit that supplies power-supply voltage to the first microcomputer the power-supply voltage starting up the first microcomputer;

determining means that determines whether or not both the internal monitoring means of the second microcomputer and the external monitoring unit are malfunctioning; and stopping means that makes the power supply unit stop supplying the power-supply voltage based on the determination by the determining means.

8. The apparatus of claim 2, wherein the first microcomputer comprises providing means that provides the external monitoring unit with an operation signal showing that the first microcomputer is in operation, and the external monitoring unit is formed to monitor operations of the first microcomputer during reception of the operation signal.

9. The apparatus of claim 2, wherein the first microcomputer comprises output means that outputs a monitoring signal to the internal monitoring means and the external monitoring unit at intervals which are set within a given period of time, the monitoring signal being for allowing both of the internal monitoring means and the external monitoring unit to monitor the operations of the first microcomputer and each of the second microcomputer and the external monitoring unit is formed to output a reset signal to the first microcomputer when the monitoring signal has not been provided from the first microcomputer for a given period of monitoring time, the reset signal resetting the operations of the first microcomputer.

10. The apparatus of claim 9, wherein the internal monitoring means is given a monitoring time which is set to monitor the operations of the first microcomputer and the external monitoring unit is given a further monitoring time monitor to monitor the operations of the first microcomputer, the monitoring time given to the internal monitoring means being different from the further monitoring time given to the external monitoring unit.

11. The apparatus of claim 10, wherein the further monitoring time given to the external monitoring unit is longer than the monitoring time given to the internal monitoring means.

12. The apparatus of claim 3, wherein
the first microcomputer comprises output means that outputs a monitoring signal to the internal monitoring means and the external monitoring unit at intervals which are set within a given period of time, the monitoring signal being for allowing both of the internal monitoring means and the external monitoring unit to monitor the operations of the first microcomputer and
each of the second microcomputer and the external monitoring unit is formed to output a reset signal to the first microcomputer when the monitoring signal has not been provided from the first microcomputer for a given period of monitoring time, the reset signal resetting the operations of the first microcomputer.

13. The apparatus of claim 3, wherein
the first microcomputer comprises output means that outputs a monitoring signal to the internal monitoring means and the external monitoring unit at intervals which are set within a given period of time, the monitoring signal being for allowing both of the internal monitoring means and the external monitoring unit to monitor the operations of the first microcomputer and
each of the second microcomputer and the external monitoring unit is formed to output a reset signal to the first microcomputer when the monitoring signal has not been provided from the first microcomputer for a given period of monitoring time, the reset signal resetting the operations of the first microcomputer.

14. The apparatus of claim 10, wherein each of the internal monitoring means and the external monitoring unit comprises
determining means for determining whether or not the first microcomputer is in a disabled state in which no return of the first microcomputer to a normal state thereof. Is expected even if the reset signal is given the first microcomputer, and
stopping means for making the power supply unit stop supplying the power-supply voltage to the first microcomputer.

15. The apparatus of claim 2, wherein
the first microcomputer comprises means for monitoring whether or not the second microcomputer is in a normal operation.

16. The apparatus of claim 2, comprising
a power supply unit that supplies power-supply voltage to the first microcomputer, the power-supply voltage starting up the first microcomputer;
determining means that determines whether or not both the internal monitoring means of the second microcomputer and the external monitoring unit are malfunctioning; and
stopping means that makes the power supply unit stop supplying the power-supply voltage.

* * * * *